United States Patent [19]
Kato

[11] Patent Number: 5,890,831
[45] Date of Patent: Apr. 6, 1999

[54] ENGAGING MECHANISM AND A HOLDER USING THEREFOR

[75] Inventor: Tsuyoshi Kato, Tochigi, Japan

[73] Assignee: Nifco Inc., Yokohama, Japan

[21] Appl. No.: 886,251

[22] Filed: Jul. 1, 1997

[30] Foreign Application Priority Data

Aug. 29, 1996 [JP] Japan .................................... 8-228650

[51] Int. Cl.⁶ ...................................................... F16B 7/04
[52] U.S. Cl. .......................... 403/329; 403/326; 403/319; 248/503.1; 296/63
[58] Field of Search ................................. 403/326, 329, 403/330, 319, 327; 248/500, 503.1; 296/65.01, 65.03, 63

[56] References Cited

U.S. PATENT DOCUMENTS

| | | | |
|---|---|---|---|
| 4,742,984 | 5/1988 | Cote et al. ............................ | 248/503.1 |
| 4,822,082 | 4/1989 | Sweers ....................................... | 296/63 |
| 5,649,783 | 7/1997 | Ichikawa et al. ................ | 248/503.1 X |

*Primary Examiner*—Anthony Knight
*Assistant Examiner*—John R. Cottingham
*Attorney, Agent, or Firm*—Kanesaka & Takeuchi

[57] ABSTRACT

A holder of the present invention is formed of a leg portion having an opening at an upper portion thereof; a flange extending outwardly from a vicinity of the opening; outer pawls projecting from the leg portion to sandwich a peripheral edge of a fitting hole together with the flange therebetween; and thick frame portions. When the leg portion of the holder is inserted into the fitting hole, the outer pawls are resiliently deformed toward depressed portions of the leg portion. When an impact is applied to the holder, abutting surfaces of the outer pawls are strongly pressed against the peripheral edge of the fitting hole. However, side surfaces of the frame portions are pressed against the peripheral edge of the fitting hole to prevent damage of the outer pawls. Thus, the holder having a reduced inserting force and improved impact resistance can be obtained.

8 Claims, 10 Drawing Sheets

ENGAGING MECHANISM AND A HOLDER USING THEREFOR

BACKGROUND OF THE INVENTION AND RELATED ART STATEMENT

The present invention relates to a holder for mounting a fitting member to a member by inserting the holder into a fitting hole of the member and engaging a hook member of the fitting member therein, and an engaging mechanism thereof.

Figure 14:
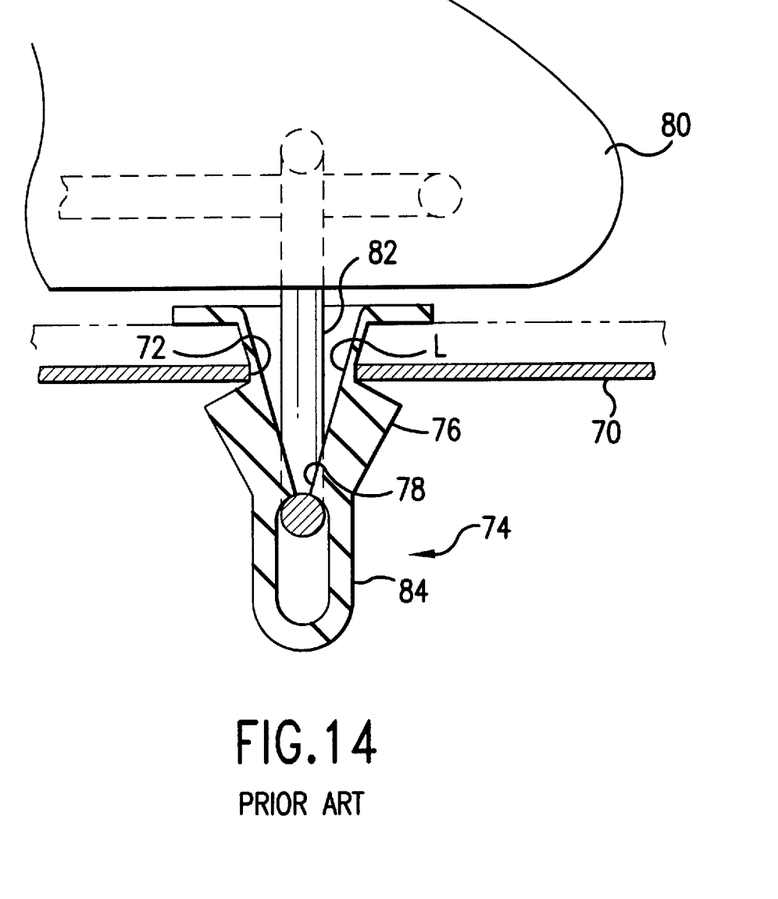
FIG. 14 is a sectional view of a retainer for a seat of a prior art.

As shown in FIG. 14, a rear seat 80 in a vehicle is generally assembled such that a retainer 74 for the seat is inserted into a fitting hole 72 provided to a panel 70 on a rear side and outer pawls 76 are engaged therewith, and a seat wire 82 in a U shape provided on a back surface of the rear seat 80 is engaged with inner pawls 78 of the retainer 74 for the seat.

A leg portion 84 of the retainer 74 for the seat is formed in a bag or closed shape since a sealing property for shutting out water, odors and noises outside the vehicle is required. The leg portion 84 is integrally formed with the outer pawls 76.

Incidentally, in order to retain flexibility of the outer pawls 76 and reduce the insertion force of the seat wire 82, the leg portion 84 is made thin around the outer pawls 76. However, when the vehicle is collided and an impact is applied to the outer pawls 76, the thin portions L of the leg portion 84 may be broken.

In view of the foregoing, the present invention has been made, and an object of the present invention is to provide a holder having a reduced insertion force and improved impact resistance for a leg portion.

Further objects and advantages of the invention will be apparent from the following description of the invention.

SUMMARY OF THE INVENTION

A holder of the present invention is used for assembling, for example, a rear seat in a vehicle, and is formed of a bag or closed shape leg portion having an opening at an upper portion thereof; a flange extending outwardly from a vicinity of the opening; outer pawls projecting from the leg portion to sandwich a peripheral edge of a fitting hole together with the flange therebetween; and a thick portion.

According to a first aspect of the present invention, when the elastically deformable leg portion in a bag or closed shape is inserted into the fitting hole of a fitting member, i.e. panel, the outer pawls projecting from the leg portion are pressed against the peripheral edge of the fitting hole to bend the leg portion inwardly. Then, when the leg portion is further inserted until the flange abuts against the fitting member, the outer pawls have passed through the peripheral edge of the fitting hole to restore the leg portion and sandwich the peripheral edge of the fitting hole together with the flange therebetween.

When an impact is applied to the outer pawls, the leg portion is deformed, so that the outer pawls are strongly pressed against the peripheral edge of the fitting hole. At this time, since the thick portion of the leg portion also abuts against the peripheral edge of the fitting hole, deformation of the leg portion is retained in a permissible range. Thus, the leg portion around the outer pawls is not broken.

According to a second aspect of the present invention, the leg portion includes thin portions, fitting frames or plate from which the outer pawls project, and thick frame portions situated around the thin portions and the fitting frames to support the same. As described above, by dividing the leg portion into the thin portions, fitting frames and thick frame portions, the outer pawls are easily bent and insertion force of the leg portion can be greatly reduced.

On the one hand, the outer pawls have notches, respectively, and receiving sections projecting from the thin portions are inserted into the notches.

Therefore, even if the impact is applied to the outer pawls, the receiving sections and the thick frame portions abut against the edge of the fitting hole to thereby keep deformation of the thin portions in a permissible range. Thus, the thin portions are not broken.

Also, since the receiving sections for receiving the impact at the central portion of the leg portion are inserted into the notches provided to the outer pawls, it is not necessary that engaging surfaces of the outer pawls abutting against the peripheral edge of the fitting hole are made smaller. Thus, extracting force of the leg portion from the fitting hole is not reduced.

According to a third aspect of the present invention, the leg portion is inserted into the fitting hole of the fitting member, and the peripheral edge of the fitting hole is sandwiched between the outer pawls and the flange.

When the impact is applied to the outer pawls, the leg portion is deformed so that the outer pawls are strongly pressed against the edge of the fitting hole. At this time, the thick frame portions abut against the edge of the fitting hole to thereby retain deformation of the leg portion in a permissible range. Thus, the leg portion around the outer pawls is not damaged and the holder is not extracted from the hole.

According to a fourth aspect of the present invention, inner pawls are projected from the inner surfaces of the leg portion, and a hook projecting from the fitting member is inserted into the opening of the leg portion to engage the inner pawls.

According to a fifth aspect of the present invention, depressed portions are provided on the side surfaces of the leg portion, and the depressed portions are supported by the thick frame portions provided therearound. Each fitting plate extends between the thick frame portions spaced apart from the depressed portion. The outer pawls project from the respective fitting plates spaced apart from the depressed portions so that the peripheral edge of the fitting hole is sandwiched between the outer pawls and the flange.

As described above, since the spaces are formed between the respective depressed portions and the outer pawls to bend the outer pawls themselves, insertion force can be reduced.

Also, the outer pawls are provided with the notches into which the receiving sections projecting from the depressed portions are inserted. Thus, even if the impact is applied to the fitting member and the outer pawls are strongly pressed against the edge of the fitting hole through the hook member, the thick frame portions and receiving sections abut against the edge of the fitting hole, and deformation of the outer pawls can be retained in a permissible range. Thus, the outer pawls are not damaged.

DETAILED DESCRIPTION OF A PREFERRED EMBODIMENT

Figure 1:
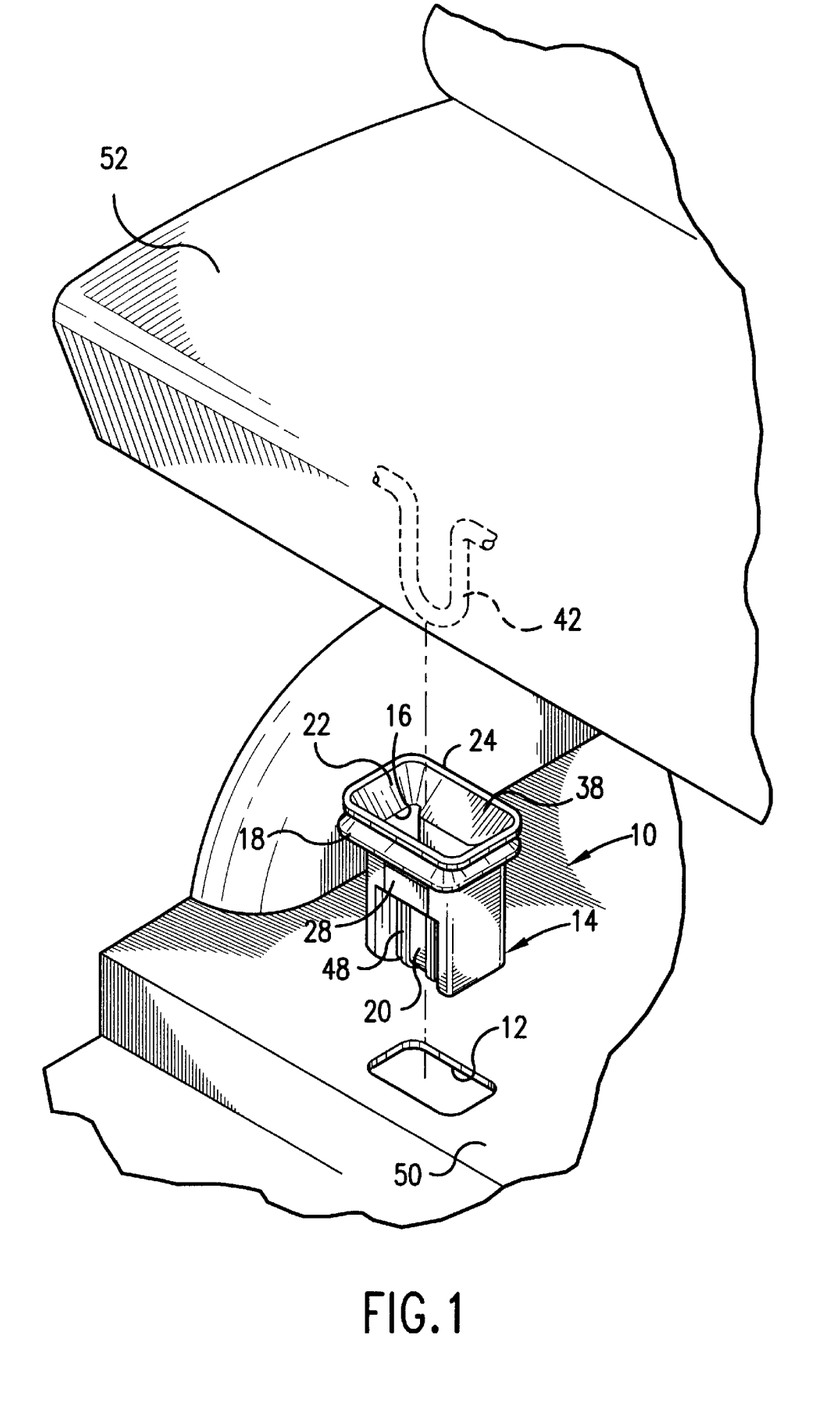
FIG. 1 is a perspective view for showing a relationship between a seat and a holder of the present invention.
Figure 2:
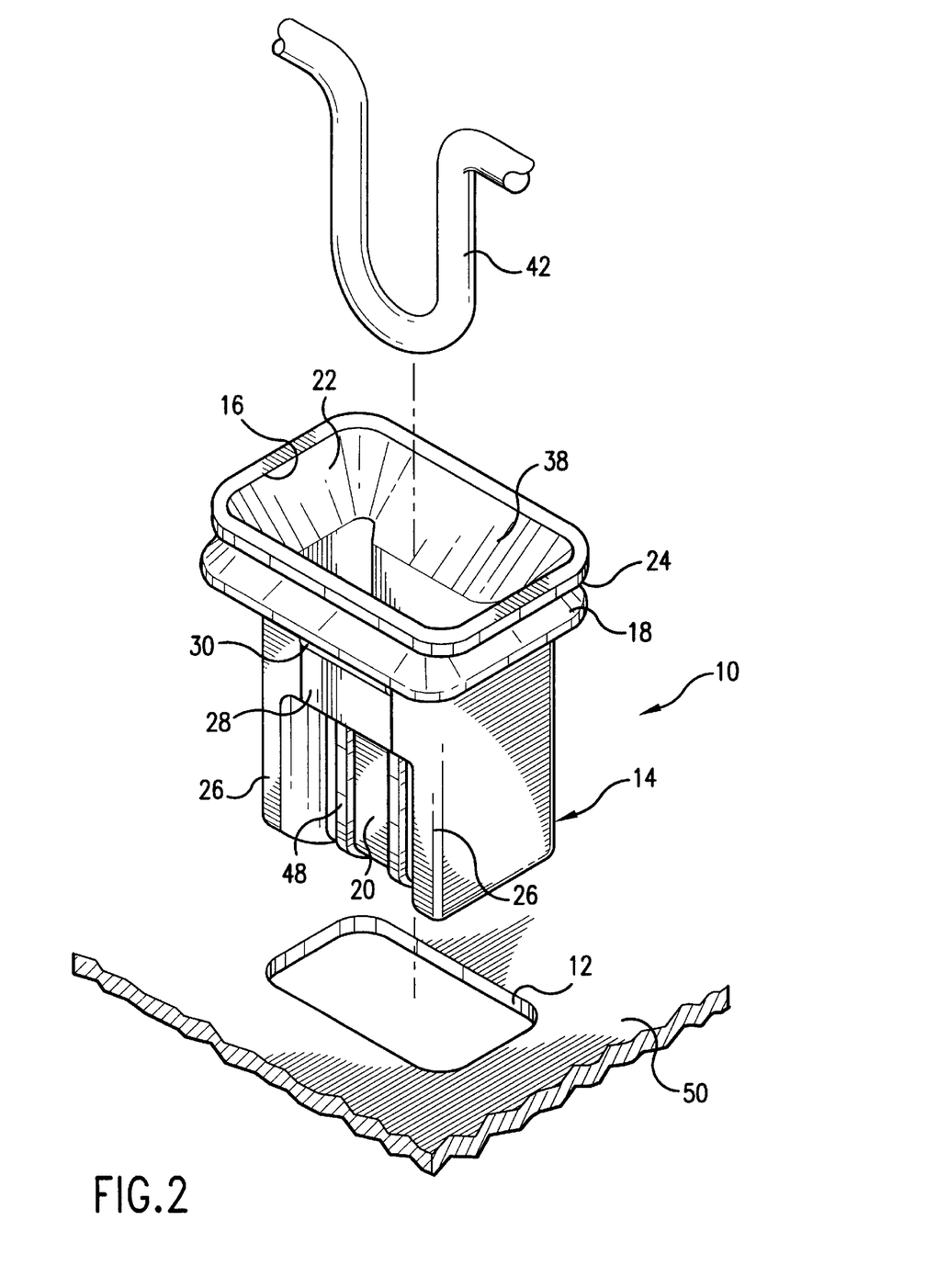
FIG. 2 is a perspective view for showing a relationship between a seat wire and the holder of the invention before the holder is inserted into a fitting hole.
Figure 3:
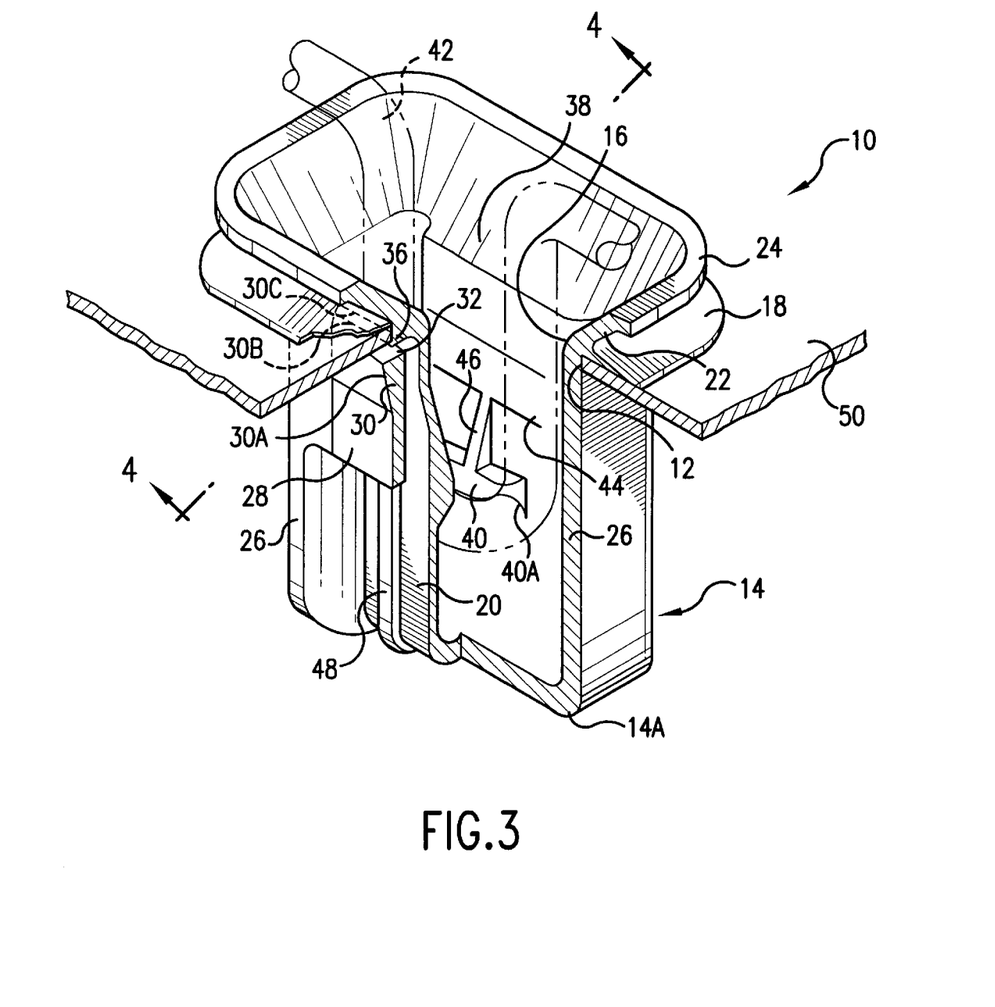
FIG. 3 is a perspective view for showing a state where the holder of the invention is inserted into the fitting hole and holds the seat wire therein.

As shown in FIGS. 1 to 3, a holder 10 according to the present invention has a bag or closed shape leg portion 14 to prevent water, odors and noises outside a vehicle from entering into the vehicle through a fitting hole 12.

An opening 16 of the leg portion 14 has a thin flange 18 extending outwardly from a peripheral edge thereof. On an upper side of the flange 18, a guide plate 22 extends diagonally upwardly from the peripheral edge of the opening 16 while gradually increasing its width in a funnel shape. The guide plate 22 has a rectangular edge portion 24 with curved corners when viewed in a horizontal plane at an outer peripheral portion thereof. A floor carpet (not shown) is sandwiched between the edge portion 24 and the flange 18.

Figure 5:
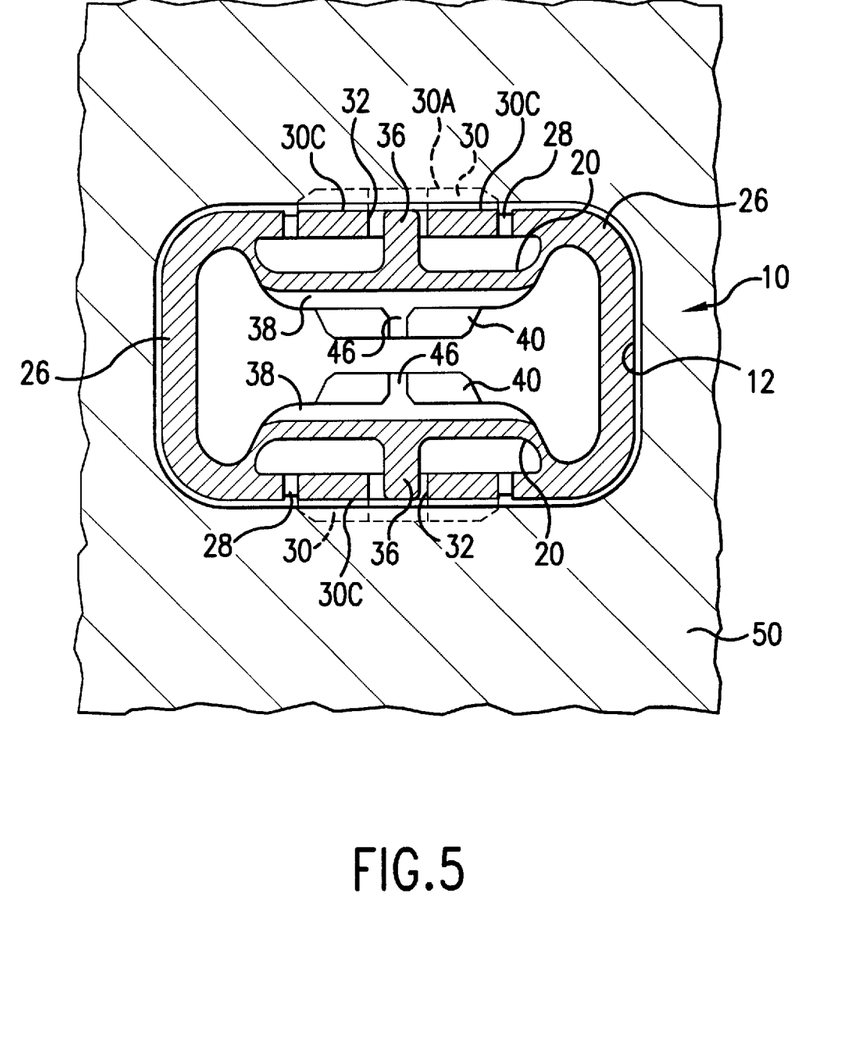
FIG. 5 is a sectional view taken along line 5—5 in FIG. 4 for showing the fitting hole and the holder of the invention.
Figure 6:
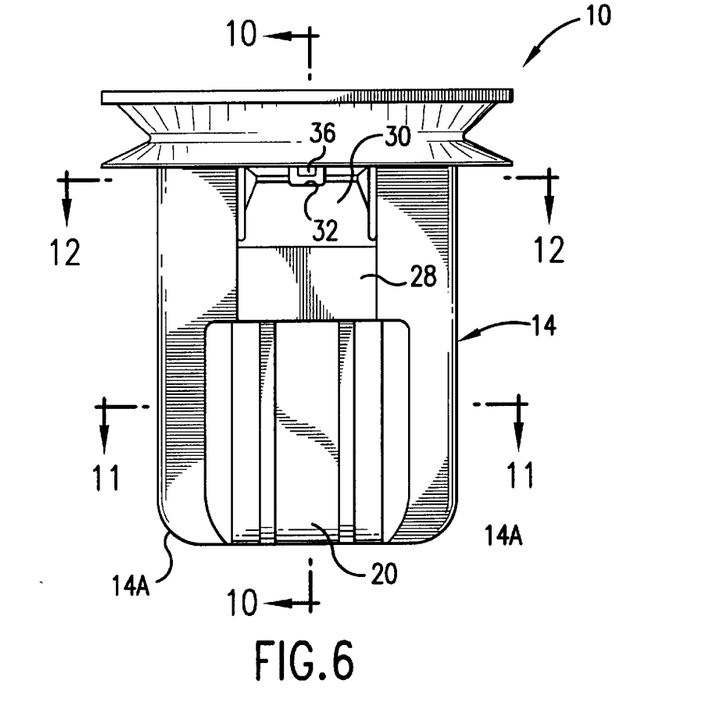
FIG. 6 is a front view of the holder of the invention.
Figure 7:
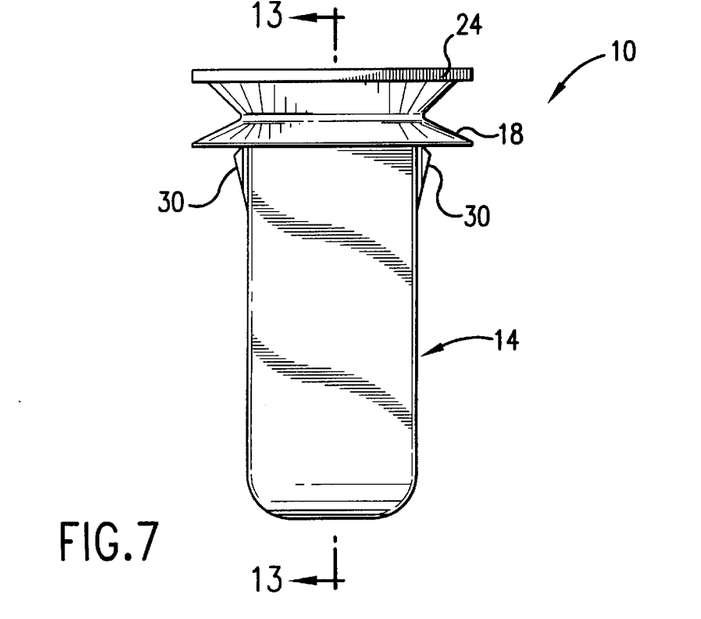
FIG. 7 is a side view of the holder of the invention.
Figure 8:
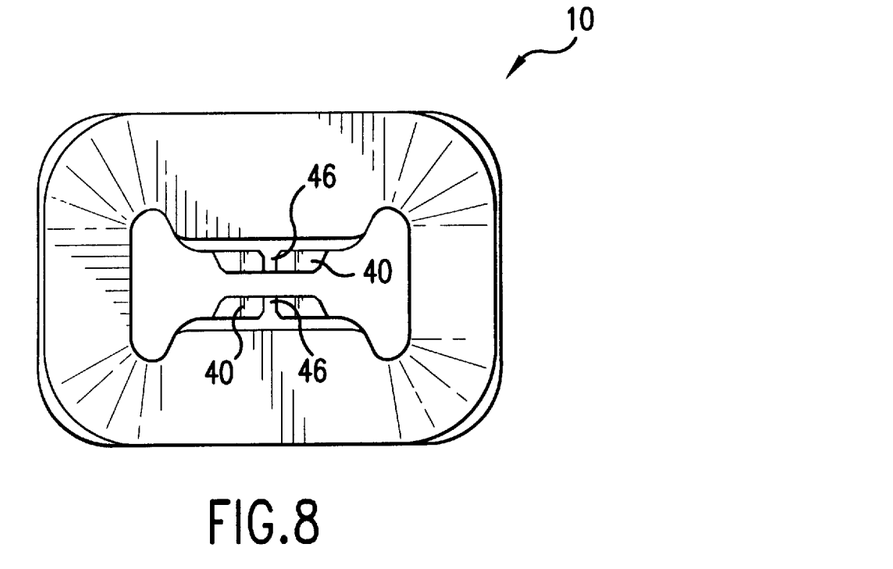
FIG. 8 is a plan view of the holder of the invention.
Figure 9:
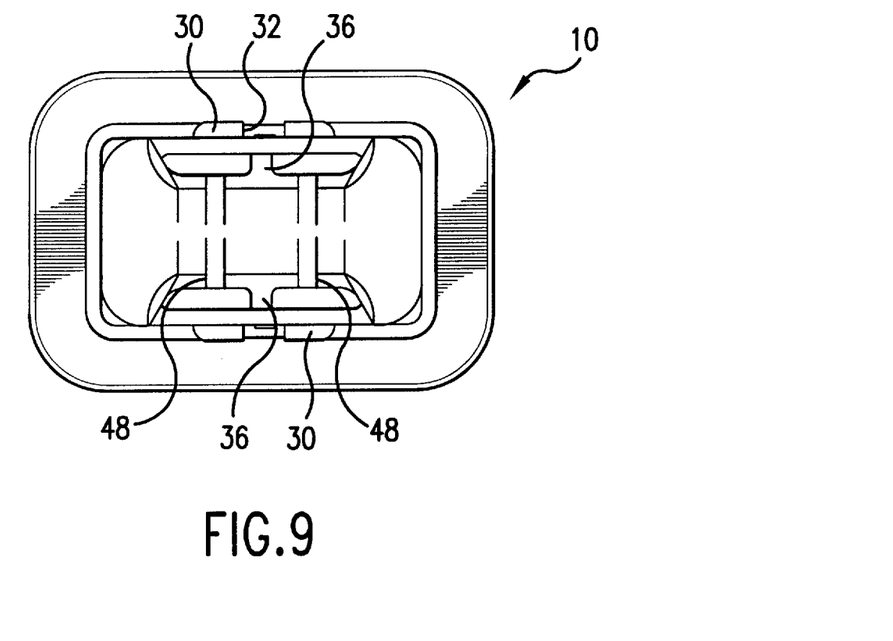
FIG. 9 is a bottom view of the holder of the invention.
Figure 10:
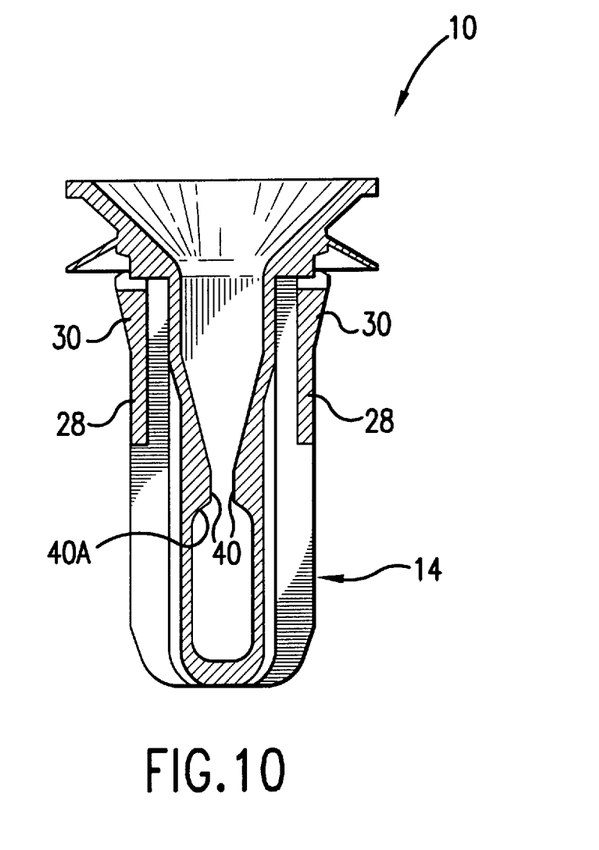
FIG. 10 is a sectional view taken along line 10—10 in FIG. 6.
Figure 11:
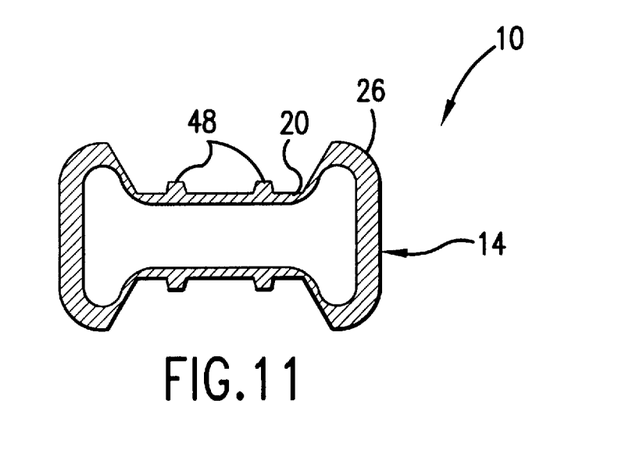
FIG. 11 is a sectional view taken along line 11—11 in FIG. 6.
Figure 12:
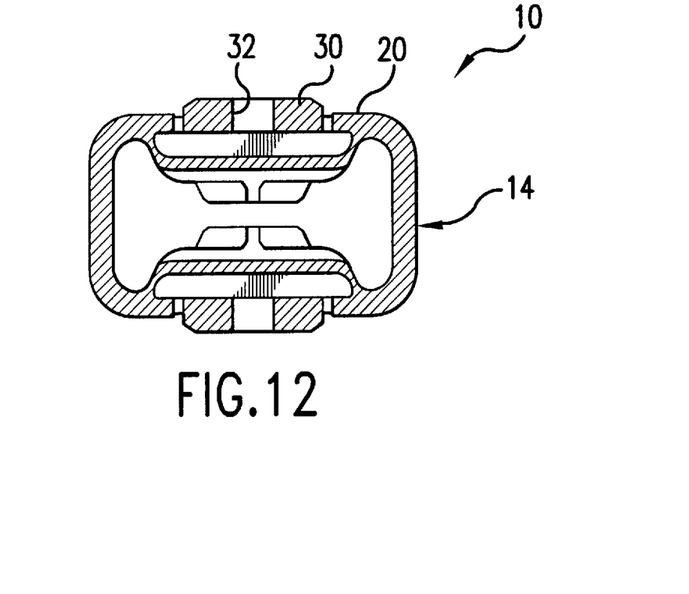
FIG. 12 is a sectional view taken along line 12—12 in FIG. 6.
Figure 13:
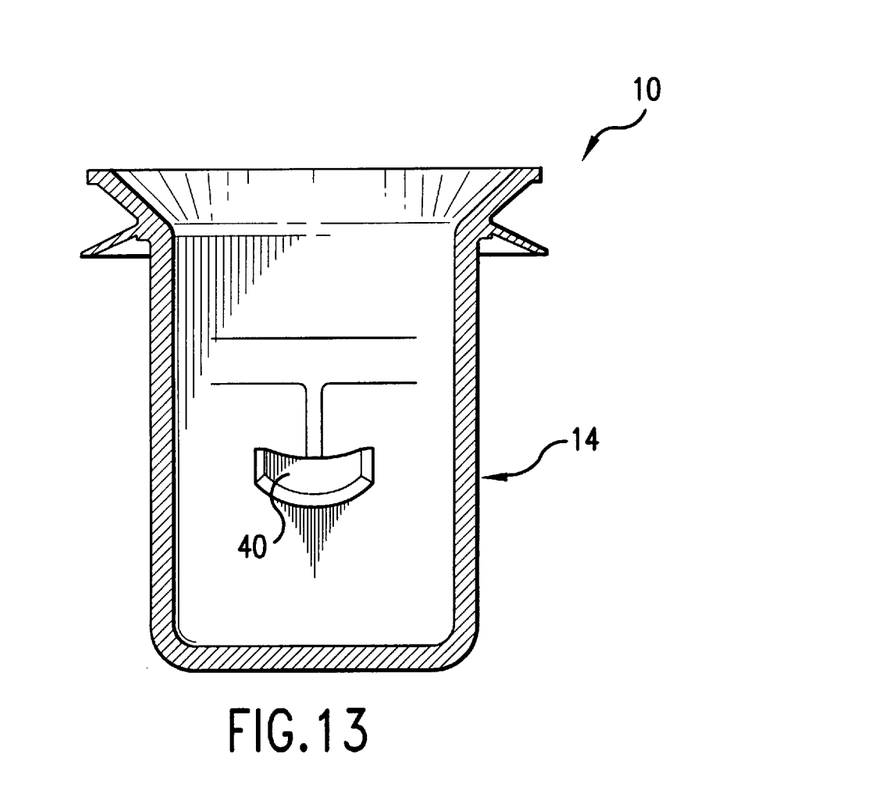
FIG. 13 is a sectional view taken along line 13—13 in FIG. 7.

The leg portion 14 has portions depressed inward at the central portions on wide side surfaces thereof to form thin depressed portions 20 extending from a bottom surface to the flange 18. As shown in FIG. 5, both sides of the depressed portions 20 and narrow width sides of the leg portion 14 are made thick to constitute frame portions 26 for receiving an impact load thereat.

Figure 4:
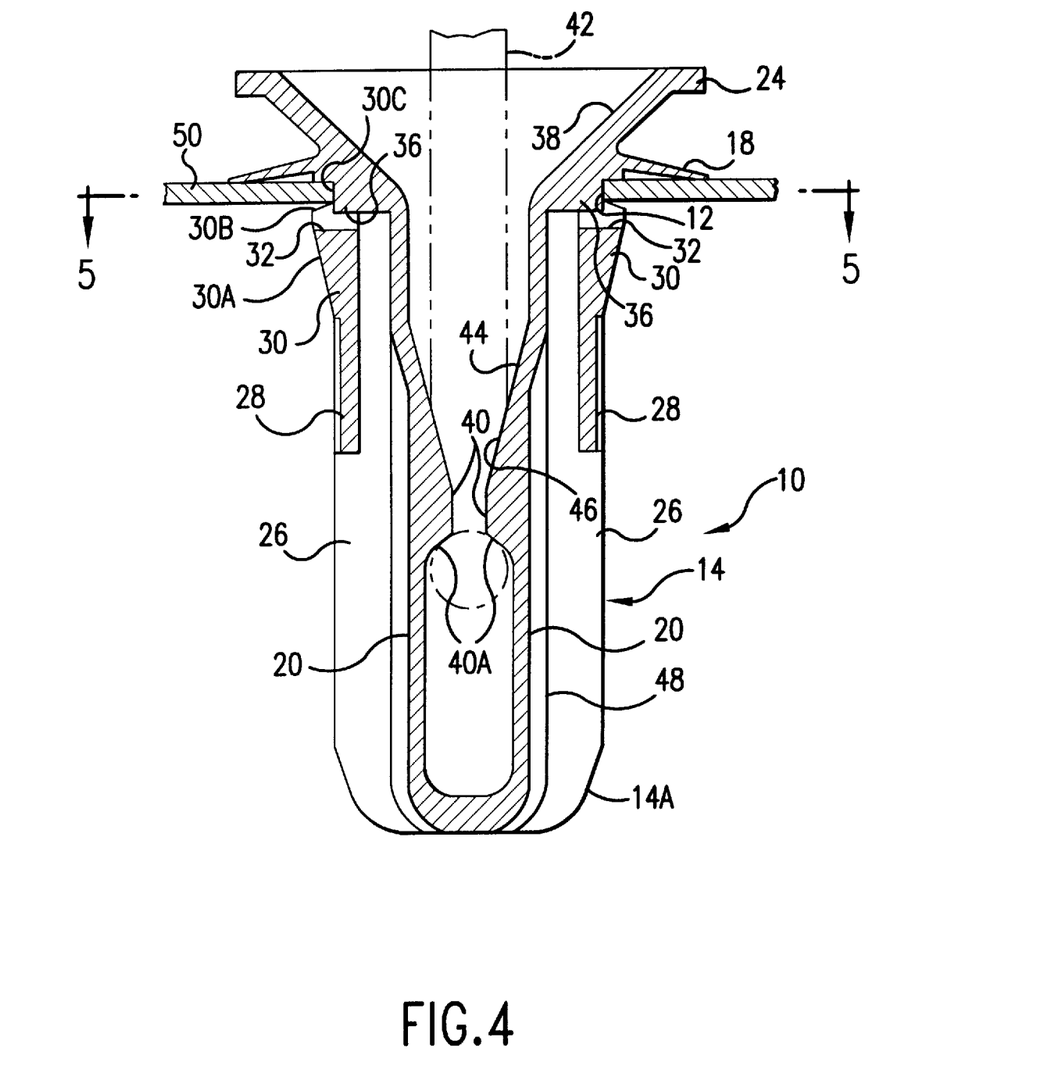
FIG. 4 is a sectional view taken along line 4—4 in FIG. 3 for showing a state where the holder of the invention is inserted into the fitting hole and holds the seat wire therein.

Fitting plates 28 extend between the frame portions 26 on both sides of the respective depressed portions 20, and are spaced apart from the depressed portions 20. The respective fitting plates 28 have outer pawls 30 projecting toward the flange 18. As shown in FIG. 4, each outer pawl 30 gradually increases its width toward the flange 18 to form an inclined surface 30A inclining outwardly. Engaging surfaces 30B extending toward the depressed portions 20 are formed at the ends of the inclined surfaces 30A. Abutting surfaces 30C vertically extend from the edges of the engaging surfaces 30B toward the flange 18 to be aligned with outer surfaces of the flames 26, respectively (Refer to FIG. 5).

Also, central portions of the abutting surfaces 30C over the engaging surfaces 30B are cut off in a rectangular shape to form notches 32. Receiving sections 36 projecting from the depressed portions 20 are inserted into the notches 32, respectively. Outer surfaces of the receiving sections 36 are aligned with the abutting surfaces 30C.

Inside the leg portion 14, contracting portions are formed along both sides of the bottom surface of the depressed portions 20, and the opening 16 is provided with tapered surfaces 38. Guide surfaces 44 extending vertically from the lower ends of the tapered surfaces 38 toward the bottom surface of the depressed portion 20 and inclining toward a mutually approaching direction are formed therein. Stays 46 in a trigonal prism shape project downward from the lower portions of the guide surfaces 44 with the same inclination angles as those of the guide surfaces 44. Holding devices or inner pawls 40 extending widthwise project from the lower ends of the stays 46. A space between the inner pawls 40 is set to be smaller than a diameter of a seat wire 42.

Also, holding portions 40A depressed in an arc shape are provided to the lower surfaces of the inner pawls 40, respectively, so that the seat wire 42 in a U-shape is held from both sides therebetween. Incidentally, the leg portion 14 has tapered portions 14A tapering toward the bottom surface thereof to thereby facilitate insertion of the leg portion 14 into the fitting hole 12. Further, the bottom surface of the depressed portions 20 is reinforced with two strips of ribs 48.

Next, functions of the holder 10 according to the present invention are explained.

As shown in FIGS. 2 and 3, when the leg portion 14 of the holder 10 is inserted into the fitting hole 12, the outer pawls 30 are resiliently deformed to the sides of the depressed portions 20 while the inclined surfaces 30A of the outer pawls 30 slide against the edge of the fitting hole 12. Incidentally, since the space between the outer pawl 30 and the depressed portion 20 is formed, the outer pawls 30 are easily bent and inserted into the fitting hole 12 with a small insertion force.

After the inclined surfaces 30A have passed through the edge of the fitting hole 12, the outer pawls 30 are resiliently restored to sandwich the edge of the fitting hole 12 between the engaging surfaces 30B and the flange 18.

Then, a slot of a carpet (not shown) is applied onto the holder 10 fixed to an under-panel 50 to pass therethrough, and the carpet is sandwiched between the flange 18 and the guide plate 22.

When a rear seat 52 (refer to FIG. 1) is placed on the holder 10, the seat wire 42 provided on a lower surface of the rear seat 52 is inserted into the opening 16 through the guide plate 22, and reaches the holding portions 40A guided by the tapered surfaces 38, guide surfaces 44 and the stays 46 while expanding the inner pawls 40. Incidentally, since the outer side of each inner pawl 40 is made thin to be bendable, only a small insertion force is required.

When an impact load is applied to the rear seat 52, the abutting surfaces 30C of the outer pawls 30 are strongly pressed against the edge of the fitting hole 12 through the seat wire 42. However, since the side surfaces of the frame portions 26 and the receiving sections 36 received in the notches 32 are also strongly pressed against the edge of the fitting hole 12, the deformation of the outer pawls 30 can be held within a permissible range to thereby prevent the outer pawls 30 from being damaged and the holder 10 from being extracted from the fitting hole 12.

Incidentally, in the present embodiment, although each fitting plate 28 extends between the frame portions 26 to form a space between the outer pawl 30 and the depressed portion 20 so that the outer pawl 30 itself is bent, the pawls may project from the side surfaces of the depressed portions 20 to be bent by taking an advantage of bending in the depressed portions 20. With this structure, since the frame portions 26 and the receiving sections 36 are also pressed against the edge of the fitting hole 12 and the deformation at the bottom surface of the thin depressed portion 20 can be held in a permissible range, the leg portion 14 is not damaged.

Also, although the inner pawls 40 for engaging the seat wire 42 have been explained hereinabove, a structure for fastening screws may be employed instead of the inner pawls 40.

Since the present invention is structured as described hereinabove, the insertion force can be reduced and the impact resistance can be improved.

While the invention has been explained with reference to the specific embodiment of the invention, the explanation is illustrative, and the invention is limited only by the appended claims.

What is claimed is:

1. An engaging mechanism to be attached to a fitting member with a fitting hole, comprising:

a leg portion having a bag shape with an opening at an upper portion thereof, said leg portion being resiliently bendable and adapted to be inserted into the fitting hole of the fitting member;

a flange fixed to the leg portion to extend outwardly from a portion near the opening;

thick frame portions formed on the leg portion to be spaced apart from each other;

thin portions formed on the leg portion, each thin portion being thinner than each thick frame portion and located between the thick frame portions;

fitting plates, each extending between the thick frame portions and being spaced from one of the thin portions; and a plurality of pawls projecting outwardly from the fitting plates, said pawls being adapted to hold and sandwich a peripheral edge of the fitting hole together with the flange so that when a load is applied to the pawls to thereby deform the leg portion, the thick frame portions abut against the peripheral edge of said fitting hole to prevent deformation and damage of the pawls.

2. An engaging mechanism according to claim 1, wherein each pawl projects outwardly from each fitting plate and has a thickness gradually increasing in a direction toward the flange, and a flat engaging surface at an upper edge thereof.

3. A holder to be attached to a fitting member with a fitting hole, comprising:

a leg portion having a bag shape with an opening at an upper portion thereof, said leg portion being resiliently bendable and adapted to be inserted into the fitting hole of the fitting member;

a flange fixed to the leg portion to extend outwardly from a portion near the opening;

thick frame portions formed on the leg portion to be spaced apart from each other;

thin portions formed on the leg portion, each thin portion being thinner than each thick frame portion and located between the thick frame portions;

fitting plates, each extending between the thick frame portions and being spaced from one of the thin portions; and a plurality of outer pawls projecting outwardly from the fitting plates, said outer pawls being adapted to hold and sandwich a peripheral edge of the fitting hole together with the flange so that when a load is applied to the outer pawls to thereby deform the leg portion, the thick frame portions abut against the peripheral edge of said fitting hole to prevent deformation and damage of the outer pawls.

4. A holder according to claim 3, further comprising a plurality of inner pawls formed inside the leg portion, said inner pawls facing each other and extending in directions to mutually approach together, said inner pawls being adapted to engage a hook portion of the fitting member inserted through the opening.

5. A holder according to claim 4, wherein each outer pawl projects outwardly from each fitting plate and has a thickness gradually increasing in a direction toward the flange, and a flat engaging surface at an upper edge thereof.

6. A holder to be attached to a fitting member with a fitting hole, comprising:

a leg portion having a bag shape with an opening at an upper portion thereof, said leg portion being adapted to be inserted into the fitting hole of the fitting member;

at least one depressed portion formed on a side surface of the leg portion;

frame portions formed on the leg portion to support the depressed portion at sides thereof, said frame portions having a thickness greater than that of the depressed portion;

at least one fitting plate extending between the frame portions to be spaced apart from the depressed portion;

a flange fixed to the leg portion to extend outwardly from a portion near the opening;

at least one outer pawl formed on the at least one fitting plate to extend in a direction away from the at least one depressed portion, said outer pawl being adapted to sandwich a peripheral edge of the fitting hole together with the flange;

at least one notch provided in the at least one outer pawl;

at least one receiving section projecting from the at least one depressed portion to be inserted into the at least one notch; and at least two inner pawls formed inside the leg portion, said inner pawls facing each other and extending in directions to mutually approach together, said inner pawls being adapted to engage a hook portion of the fitting member inserted through said opening.

7. An engaging mechanism according to claim 1, wherein said thin portions have receiving sections projecting outwardly from the thin portions, said pawls having notches to receive the respective receiving sections.

8. A holder according to claim 3, wherein said thin portions have receiving sections projecting outwardly from the thin portions, said pawls having notches to receive the respective receiving sections.

* * * * *